(12) United States Patent
DeSanto

(10) Patent No.: US 9,914,168 B2
(45) Date of Patent: Mar. 13, 2018

(54) NOZZLE SAND AND METHOD OF USE AND OPERATION

(71) Applicant: KBI Enterprises, LLC, St. Louis, MO (US)

(72) Inventor: Dale F. DeSanto, Wildwood, MO (US)

(73) Assignee: KBI Enterprises, LLC, St. Louis, MO (US)

(*) Notice: Subject to any disclaimer, the term of this patent is extended or adjusted under 35 U.S.C. 154(b) by 107 days.

(21) Appl. No.: 14/814,023

(22) Filed: Jul. 30, 2015

(65) Prior Publication Data
US 2016/0031009 A1 Feb. 4, 2016

Related U.S. Application Data

(60) Provisional application No. 62/031,505, filed on Jul. 31, 2014.

(51) Int. Cl.
*B22D 41/46* (2006.01)
*C04B 35/06* (2006.01)
*B22D 41/44* (2006.01)

(52) U.S. Cl.
CPC ........... *B22D 41/465* (2013.01); *B22D 41/44* (2013.01); *C04B 35/06* (2013.01); *C04B 2235/321* (2013.01); *C04B 2235/3217* (2013.01); *C04B 2235/3445* (2013.01); *C04B 2235/422* (2013.01); *C04B 2235/5292* (2013.01)

(58) Field of Classification Search
CPC ................. B22D 41/44; B22D 41/465; C04B 2235/321; C04B 2235/3217; C04B 2235/3445; C04B 2235/422; C04B 2235/5292; C04B 35/06
USPC .................. 266/45, 272; 222/590, 597, 563; 106/196.1, 197.01, 198.1, 199.1, 284.05; 501/108, 127, 133
See application file for complete search history.

(56) References Cited

U.S. PATENT DOCUMENTS

| | | | | | |
|---|---|---|---|---|---|
| 4,113,501 A | * | 9/1978 | Edamoto | ................ | B22D 41/46 106/196.1 |
| 5,246,648 A | * | 9/1993 | Hammer | ................ | C04B 2/102 264/658 |

* cited by examiner

*Primary Examiner* — Jessee Roe
*Assistant Examiner* — Michael Aboagye
(74) *Attorney, Agent, or Firm* — Matthews Edwards LLC

(57) ABSTRACT

A nozzle sand and method of use and operation, utilizes as a constituent component a granulated material that will break down to lose structural integrity and strength when subjected to temperatures and weight of molten ferrous materials, to compact to form at least a partial barrier to penetration of the molten ferrous material while remaining at least substantially in a granulated state. When the nozzle is opened, the loose nozzle sand will freely flow from the nozzle and the barrier will break under the weight of the ferrous material, such that the ferrous material will flow from the vessel through the nozzle. As a representative formulation, the nozzle sand can include between about 50 percent and about 60 percent by weight raw dolomitic lime; between about 20 percent and about 30 percent by weight forsterite; and between about 15 percent and about 20 percent by weight tabular alumina.

7 Claims, 3 Drawing Sheets

NOZZLE SAND AND METHOD OF USE AND OPERATION

This application claims the benefit of U.S. Provisional Application No. 62/031,505, filed Jul. 31, 2014.

TECHNICAL FIELD

The present invention relates generally to a nozzle sand and method of use and operation, and more particularly, that incorporates sands with improved refractory and other properties that facilitate the free opening of nozzles of ladles, other molten metal holding vessels, and the like used in steel making and other metallurgical applications.

BACKGROUND ART

U.S. Provisional Application No. 62/031,505, filed Jul. 31, 2014, is incorporated herein by reference in its entirety.

In electric arc furnace plants, metal scrap is melted in a batch furnace and tapped into a transfer ladle. Within this ladle, further alloying agents can be added, vacuum degassing can occur, along with further heating to maintain metal temperature. The molten steel can be held in the ladle from approximately 60 to 300 minutes depending on various factors. When the ladle is to be emptied, the slide gate is shifted allowing holes in both plates to align and metal flow to begin. The current standard practice in the steel industry is to fill the upper cavity of the nozzle and well block assembly with a graded blend of refractory sands to avoid freezing of the molten steel, causing a non-free open of the ladle. The molten steel contacts the sand bed and forms a composite sand-steel 'interfacial zone.' When the slide gate is opened, the loose sand flows out and the ferrostatic head pressure of the steel breaks through the interfacial zone and into the receiving tundish. As the time the metal is held in the ladle increases, permeation of the steel into the sand bed increases and this 'interfacial' zone thickens. This often results in a non-free open where operators use a stainless steel pipe with oxygen to burn through the interface and allow the steel to flow.

The current industry standards for ladle nozzle sand revolve around four main components; silica sand, zircon sand, chromite sand, and a fine carbon grain. These are blended in various ratios depending on the practice at the individual mill. The most active species is usually considered to be the zircon sand although its use is being eliminated in favor of chromite sand in some cases. The general rule is that as the hold times of the molten steel in the ladle increases, the zircon content is increased to improve the chances of free opening. There are drawbacks to zircon sand's use in that it will adhere to the well and nozzle refractories over time and can cause wear as well as a need for mechanical removal when the ladle is prepared for another charge. Also, historically zircon supply and pricing has fluctuated dramatically based on global demand. The chromite sand is used to counter some of the effects of zircon sand and as a lower cost alternative completely replacing zircon in some instances. Chromite sand is also a relatively expensive commodity item and is subject to commercial fluctuations. The silica sand is a low cost filler material and the fine carbon is used to limit permeation of the steel into the sand bed and to reduce some of the corrosive effects of the steel on the well and nozzle assembly.

SUMMARY OF THE INVENTION

The present invention overcomes one or more of the shortcomings and limitations set forth above, by providing a nozzle sand and method of use and operation, that incorporates sands with improved refractory and other properties that facilitate the free opening of nozzles of ladles, other molten metal holding vessels, and the like used in steel making and other metallurgical applications.

According to a preferred aspect, the present invention is directed to a nozzle sand and method of use and operation that overcomes one or more of the issues set forth above. The preferred components of the sand comprise raw dolomitic lime, synthetic forsterite, tabular alumina, and metallurgical grade coke, in advantageous forms and blends.

According to a more particular preferred aspect of the invention, using a particle size distribution designed to allow for a free flow and dense fill of the ladle nozzle cavity, the component grains are combined to form the final ladle nozzle sand. The preferred formulation is about 50-60 wt % raw dolomitic lime, about 20-30 wt % forsterite, about 15-20 wt % tabular alumina, and about 3-8 wt % metallurgical grade coke.

According to another preferred aspect of the invention, all of the component grains are selected and formulated to have sufficient refractoriness to withstand the 2800-3000° F. temperatures of molten steel contact. The significant technical difference between the sand and method of the invention and current state of the art is the use of raw dolomitic lime. Raw dolomite as it will be further referred, is a mixture of calcium carbonate and magnesium carbonate that breaks down at temperatures above about 1391° F. forming calcium oxide, magnesium oxide, and carbon dioxide. This reaction is advantageously utilized according to the method of the invention. According to a preferred embodiment, when the nozzle sand is poured into the ladle nozzle cavity, the residual heat in the ladle will start to break down the raw dolomite in situ. In operation, the raw dolomite component which has now been calcined in situ has lost about 40 wt % as evolved carbon dioxide. In the method of the invention, this low density grain will act as a compressible layer under the ferrostatic load of a full steel ladle. The coarse grains will compress into ultra-fine particles which will limit permeability of the molten steel into the sand bed. The low density grains that aren't compressed will act as an insulating layer to reduce heat soak from the melt into the sand bed, further limiting permeation of the steel into the sand bed.

The chemistry of the new nozzle sand results in a lower density of approximately 105 pounds per cubic foot (pcf). The current commercial sands are in the range of 150-180 pcf. After the new nozzle sand experiences thermal breakdown upon addition to the nozzle cavity the effective density of the sand is approximately 80 pcf. This lighter weight allows the ferrostatic head pressure to expel the sand bed more easily upon opening the nozzle.

The remaining component grains aid in limiting over compression of the nozzle sand, permeation of molten steel into the sand bed, and corrosion of the nozzle assembly by the steel and slag.

DETAILED DESCRIPTION OF PREFERRED EMBODIMENTS OF THE INVENTION

Figure 1:
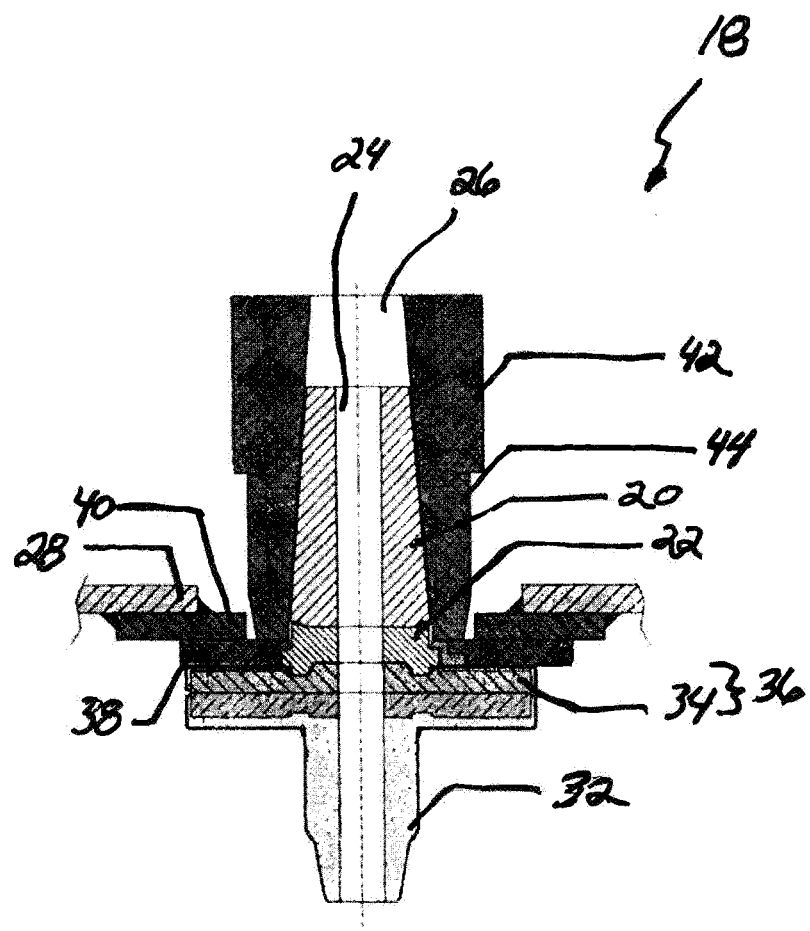
FIG. 1 is a simplified side sectional view of a representative nozzle for use in a well region of a molten metal holding vessel such as a ladle used in the steel making industry, with a bottom plate shown in an open position to allow flow of molten steel through the nozzle.
Figure 2:
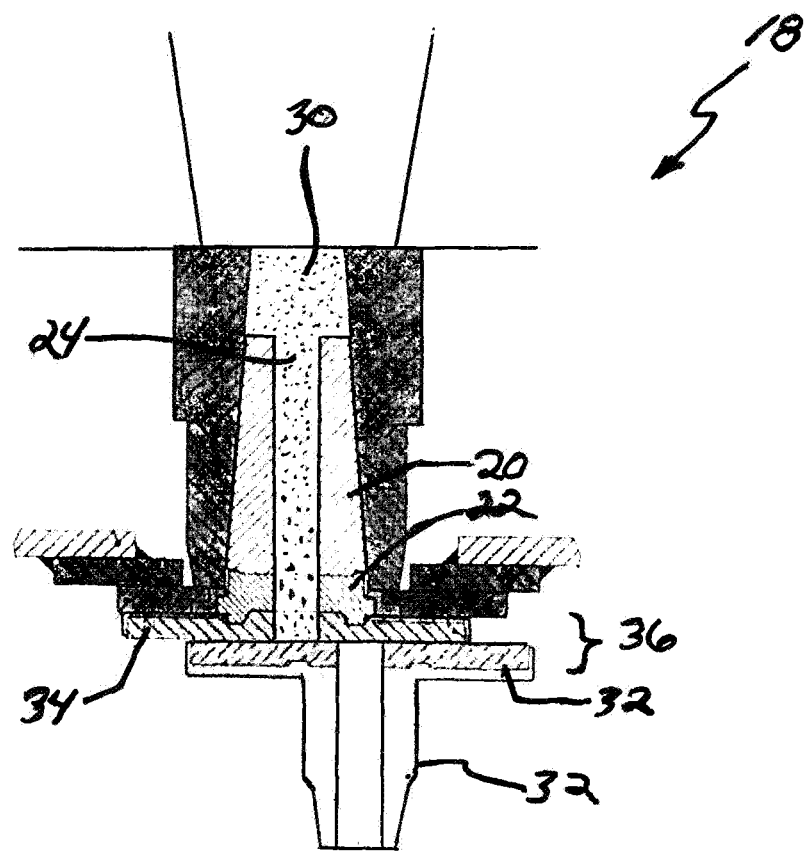
FIG. 2 is another side sectional view of the nozzle with the bottom plate closed, to contain a quantity of nozzle sand of the invention in a cavity of the nozzle.
Figure 3:
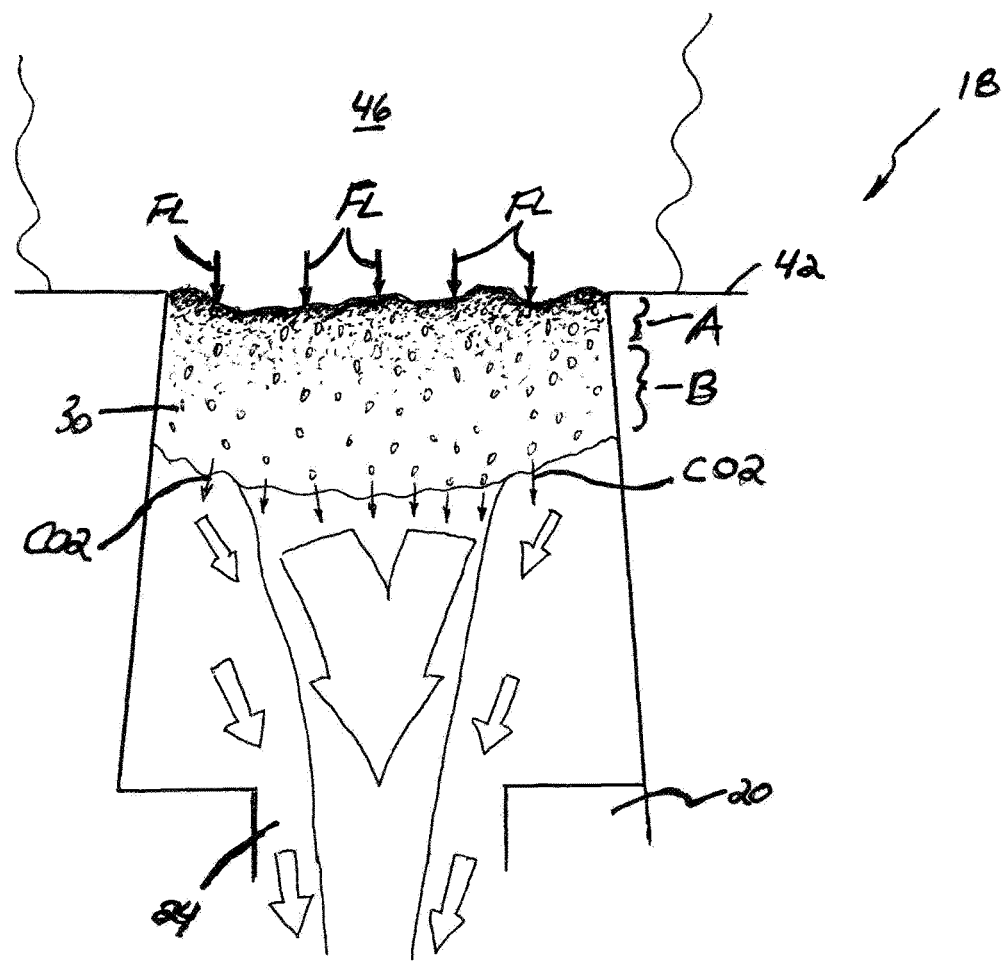
FIG. 3 is an enlarged side sectional view of the nozzle and adjacent well region of the molten metal holding vessel containing a molten ferrous material exerting a ferrostatic pressure on the sand, after opening of the bottom slide plate to evacuate the nozzle sand to allow flow of the molten ferrous material through the nozzle.

Referring now to the drawings, in FIGS. 1 through 3, a representative nozzle assembly 18 comprising an upper nozzle 20 and a lower nozzle 22, bounding a nozzle cavity 24 below and connecting to a well region 26 of a molten metal holding vessel 28, is shown, vessel 28 representing a wide range of vessels including ladles commonly used in the steelmaking industry, and lined with a suitable refractory material (deleted for simplicity). When closed, as illustrated in FIG. 2, nozzle assembly 18 will hold a quantity of nozzle sand 30 by slidable closure of a lower plate 32 relative to an upper plate 34 of a gate valve assembly 36 in the well known manner. Valve assembly 36 is mounted on an adapter plate 38 affixed to a mounting plate 40, which in turn is affixed to the bottom of vessel 28 about a lower opening of well region 26, which is bound by top and bottom well blocks 42 and 44, which are surrounded by refractory material, and hold nozzles 20 and 22 in position.

The preferred components of nozzle sand 30 are granules of raw dolomitic lime, synthetic forsterite, tabular alumina, and metallurgical grade coke, in a particle distribution designed to allow for a free flow and dense fill of nozzle cavity 24. A preferred formulation is about 50-60 wt % raw dolomitic lime; about 20-30 wt % forsterite; about 15-20 wt % tabular alumina; and about 3-8 wt % metallurgical grade coke. All of the component grains are selected and formulated to have sufficient refractoriness to withstand the 2800-3000° F. temperatures of molten steel contact. The raw dolomitic lime is a mixture of calcium carbonate and magnesium carbonate that breaks down at temperatures above about 1391° F. forming calcium oxide, magnesium oxide, and carbon dioxide. This reaction is advantageously utilized according to the method of the invention as explained next.

According to a preferred embodiment, when the nozzle sand 30 is poured into nozzle cavity 24, the residual heat in the vessel 28 will start to break down the raw dolomite in situ. In operation, the raw dolomite component which has now been calcined in situ has lost about 40 wt % as evolved carbon dioxide. In the method of the invention, this low density grain will act as a compressible layer A (FIG. 3) under the ferrostatic load, denoted by arrows FL, of the molten ferrous material 46 contained in vessel 28. The coarse grains will compress into ultra-fine particles which will limit permeability of the molten steel into the sand bed. The low density grains that aren't compressed will act as an insulating layer B to reduce heat soak from the melt into the sand bed, further limiting permeation of the steel into the sand bed. Layer B will vary in height, generally as a function of time, and can have a height of several inches.

The chemistry of the new nozzle sand results in a lower density of approximately 105 pounds per cubic foot (pcf) in the fresh state. The current commercial sands are in the range of 150-180 pcf. After the new nozzle sand experiences thermal breakdown upon addition to the nozzle cavity the effective density of the sand is approximately 80 pcf. This lighter weight allows the ferrostatic head pressure or load FL to expel the sand bed more easily upon opening the nozzle, as denoted by the larger arrows in FIG. 3.

The remaining component grains aid in limiting over compression of the nozzle sand, permeation of molten steel into the sand bed, and corrosion of the nozzle assembly by the steel and slag. Carbon dioxide, denoted by arrows CO2 in FIG. 3, released by the breakdown of the dolomite, can accumulate and pressurize in the upper regions of the sand bed, to facilitate the release and evacuation of the sand from nozzle cavity 24. In some instances, this can be observed as a "popping" sound and acceleration of the sand passage from the lower plate followed by rapid flow of the ferrous material.

In light of all the foregoing, it should thus be apparent to those skilled in the art that there has been shown and described a NOZZLE SAND AND METHOD OF USE AND OPERATION. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:
1. A nozzle sand, comprising:
a mixture of sands comprising between about 20 percent and about 30 percent by weight forsterite, and between about 15 percent and about 20 percent by weight tabular alumina, and as a constituent component, between about 50 percent and about 60 percent by weight of a granulated raw dolomitic lime that when disposed in a nozzle of a vessel holding a molten ferrous material, is configured to break down and compact into a smaller granule size to form at least a partial barrier to penetration of the molten ferrous material into the mixture.

2. The nozzle sand of claim 1, wherein the mixture comprises between about 3 percent and about 8 percent by weight metallurgical grade coke.

3. The nozzle sand of claim 1, wherein the mixture has a density of about 105 pounds per cubic foot.

4. The nozzle sand of claim 1, wherein the mixture will have a density of about 80 pounds per cubic foot after the breakdown.

5. A nozzle sand, comprising:
between about 50 percent and about 60 percent by weight raw dolomitic lime;
between about 20 percent and about 30 percent by weight forsterite; and
between about 15 percent and about 20 percent by weight tabular alumina.

6. The nozzle sand of claim 5, further comprising between about 3 percent and about 8 percent by weight metallurgical grade coke.

7. The nozzle sand of claim 5, having a density of approximately 105 pounds per cubic foot.

* * * * *